(12) United States Patent
Derousse

(10) Patent No.: US 9,991,636 B2
(45) Date of Patent: Jun. 5, 2018

(54) ELECTRICAL BOX, ELECTRICAL SWITCH AND ELECTRICAL PLUG-IN MECHANISM

(71) Applicant: Welda William Derousse, Red Bud, IL (US)

(72) Inventor: Welda William Derousse, Red Bud, IL (US)

(*) Notice: Subject to any disclaimer, the term of this patent is extended or adjusted under 35 U.S.C. 154(b) by 0 days. days.

(21) Appl. No.: 15/530,965

(22) Filed: Mar. 29, 2017

(65) Prior Publication Data

US 2017/0310049 A1 Oct. 26, 2017

Related U.S. Application Data

(60) Provisional application No. 62/391,123, filed on Apr. 21, 2016.

(51) Int. Cl.
| | |
|---|---|
| *H01R 13/60* | (2006.01) |
| *H01R 13/639* | (2006.01) |
| *H01R 13/645* | (2006.01) |
| *H02G 3/14* | (2006.01) |
| *H02G 3/16* | (2006.01) |
| *H02G 3/18* | (2006.01) |
| *H01R 13/652* | (2006.01) |
| *H01R 25/00* | (2006.01) |

(52) U.S. Cl.
CPC ..... *H01R 13/6395* (2013.01); *H01R 13/6456* (2013.01); *H01R 13/652* (2013.01); *H01R 25/006* (2013.01); *H02G 3/14* (2013.01); *H02G 3/16* (2013.01); *H02G 3/18* (2013.01)

(58) Field of Classification Search
CPC ..................................................... H01R 24/78
USPC ............................................. 439/535; 174/53
See application file for complete search history.

(56) References Cited

U.S. PATENT DOCUMENTS

| | | | | | |
|---|---|---|---|---|---|
| 1,938,309 | A | * | 12/1933 | Williams | H02B 1/056 174/55 |
| 2,828,394 | A | * | 3/1958 | Mayzik | H02B 1/056 174/55 |
| 2,908,743 | A | * | 10/1959 | Premoshis | H02G 3/121 174/53 |
| 3,609,647 | A | * | 9/1971 | Castellano | H01R 25/006 174/53 |
| 3,879,101 | A | * | 4/1975 | McKissic | H01H 1/58 439/535 |
| 4,165,443 | A | * | 8/1979 | Figart | H02G 3/16 174/53 |
| 4,273,957 | A | * | 6/1981 | Kolling, Jr. | H04M 1/0293 174/53 |

(Continued)

*Primary Examiner* — Neil Abrams

(57) ABSTRACT

An electrical box, switch and plug-in device, that facilitates the prompt and safe installation and maintenance of the components within an electrical box. The box includes a wiring connector, molded or affixed to an internal wall of the electrical box, for receiving external incoming power, and connects with a movable male electrical wiring connector, that can be plugged into the back of an installed electrical switch or electrical plug-in device. The mail electrical wiring connector, mounted upon its wiring, can be shifted within the box, to align it for plug-in with the identified electrical devices. The wiring connector incorporates a series of slots, such that when the various electrical wiring is connected therewith, the bare wires are concealed and secured therein, to assure safety.

4 Claims, 2 Drawing Sheets

(56) References Cited

U.S. PATENT DOCUMENTS

| | | | | |
|---|---|---|---|---|
| 4,295,018 A * | 10/1981 | Borrelli | .................. | H02B 1/056 |
| | | | | 174/53 |
| 4,842,551 A * | 6/1989 | Heimann | ............... | H01R 27/00 |
| | | | | 174/58 |
| 6,558,190 B1 * | 5/2003 | Pierson, Jr. | ............ | H01R 9/226 |
| | | | | 439/535 |
| 6,617,511 B2 * | 9/2003 | Schultz | .................. | H01R 24/70 |
| | | | | 174/50 |
| 7,160,147 B1 * | 1/2007 | Stephan | .................. | H01R 9/24 |
| | | | | 174/60 |
| 7,273,392 B2 * | 9/2007 | Fields | .................... | H01R 25/00 |
| | | | | 174/53 |
| 8,371,863 B1 * | 2/2013 | Ganta | .................... | H02G 3/105 |
| | | | | 439/107 |
| 8,415,561 B2 * | 4/2013 | Gates | .................. | H01R 13/508 |
| | | | | 174/481 |
| 8,690,601 B2 * | 4/2014 | Perritt | .................... | H02G 3/126 |
| | | | | 439/535 |
| 8,921,694 B2 * | 12/2014 | Moss | ....................... | H02G 3/16 |
| | | | | 174/481 |
| 8,951,064 B2 * | 2/2015 | Keswani | ................ | H01R 24/78 |
| | | | | 439/535 |

\* cited by examiner

ELECTRICAL BOX, ELECTRICAL SWITCH AND ELECTRICAL PLUG-IN MECHANISM

CROSS REFERENCE TO RELATED APPLICATIONS

This application claims the benefit of U.S. Provisional Patent Application No. 62/391,123, filed Apr. 21, 2016.

Field of classification search (174/50; 174/53; 174/59; 174/66; 174/520; 200/315; 307/112; 315/360; 361/42; 361/807; 439/136; 439/521; 439/535; 439/539; 439/625) International classification (B23P 11/00; B23P 17/00; B602 1/00; H05B 33/0845; H01H 1/36; H01H 3/38; H01H 9/02; H01H 21/02; H01H 21/025; H01H 23/16; H01H 33/72; H01H 33/182; H01H 47/00; H01H 47/22; H01H 50/16; H02B 1/24; H02G 3/08; H02G 3/10; H02G 3/12; H02G 3/14; H02G 3/18; H02G 3/086; 4/42; H05K 5/00; H05K 5/03; H05K 13/00; H05K 5/02; H05K 7/04; H05K 5/0217; H01R 4/42; H01R 13/58; H01R 13/60; H01R 13/66; H01R 13/73; H01R 13/74; H01R 13/514; H01R 13/703; H01R 13/748; H01R 13/6675; H01R 25/00; H01R 25/006; HR01R 13/154; H04N 7/188; G08B 13/24; G08B 13/196; G11C 11/419) U.S. classification CPC (B602 1/00; F21V 23/00; F21V 23/001; F21V 23/02; F21V 23/04; F21V 23/023; G05F 3/02; G08B 13/19639; H01H 1/36; H01H 3/60; H01H 9/54; H01H 21/02; H01H 21/04; H01H 21/30; H01H 23/04; H01H 23/16; H01H 47/00; H01H 47/22; H01H 50/16; H01R 3/14; H02G 3/08; H02G 3/10; H02G 3/12; H01R 25/00; H01R 2103/00; H02B 1/24; H02G 3/14; H02G 3/16; H02G 3/18; H02G 3/081; H05K 5/03; H05B 33/08; G08B 13/249), and U.S. classification USPC (174/50; 174/53; 174/59; 174/66; 174/520; 200/315; 307/112; 315/360; 361/42; 361/807; 439/136; 439/521; 439/535; 439/539; 439/625).

STATEMENT REGARDING FEDERALLY SPONSORED RESEARCH OR DEVELOPMENT

Not Applicable.

NAMES OF THE PARTIES TO A JOINT RESEARCH AGREEMENT IF THE CLAIMED INVENTION WAS MADE AS A RESULT OF ACTIVITIES WITHIN THE SCOPE OF A JOINT RESEARCH AGREEMENT

Not Applicable.

REFERENCE TO A "SEQUENCE LISTING," A TABLE, OR A COMPUTER PROGRAM LISTING APPENDIX SUBMITTED ON A COMPACT DISC AND AN INCORPORATION BY REFERENCE OF THE MATERIAL ON THE COMPACT DISC. THE TOTAL NUMBER OF COMPACT DISC INCLUDING DUPLICATES AND THE FILES ON EACH COMPACT DISC SHALL BE SPECIFIED

Not Applicable.

BACKGROUND OF THE INVENTION

An electrical box, electrical switch and electrical plug-in mechanism that consists of a newly improved electrical box design consisting of electrical terminals and/or electrical receptacles for an electrical wire to be connected via male/female connection to an electrical switch or an electrical plug-in. An electrical box connection consists of an improved electrical wire installation connection completing the electical circuit within the electrical box minimizing contact with electrical wiring.

An electrical box, electrical switch and electrical plug-in mechanism consists of male/female electrical terminal and/or electrical receptacle connections allowing the user/installer to install/replace an electrical switch or electrical plug-in with ease with the newly designed electrical box.

Current installations of electrical boxes with electrical switches or electrical plug-ins are unsafe to the user/installer via existing electrical box design(s), fastened by screw(s) and exposed wires to the user/installer. The current electrical box has corrected this unsafe design, making it safer/quicker/easier for the user/installer. Specific design improvements include a newly designed electrical box, electrical switch and electrical plug-in mechanism design allowing the user/installer to replace an electrical switch or electrical plug-in without being exposed to the electrical wiring, reducing the risk of shock, serious injury and/or death. Improvements of the electrical box will increase installation efficiency with replacement of current electrical boxes, providing a quick and easy installation/replacement to the user/installer when replacing existing electrical boxes.

Installation/replacement of a new electrical box, electrical switch and electrical plug-in mechanism design will allow safe, quick and easy replacement of existing electrical switches or electrical plug-ins with the newly improved electrical box will be significantly safer for the user/installer. The new design allows the user/installer to update current/existing electrical boxes with a safer newly designed electrical box. The newly designed electrical box allows the user/installer to safely install the newly designed electrical box device, updating the existing electrical box which is unsafe with exposed electrical wiring connections. The newly designed electrical box allows the user/installer to install/replace an electrical switch or an electrical plug-in, reducing exposure to the existing electrical wires, which increases safety to the user/installer during installation. The newly designed electrical box allows the user to quickly attach/remove an electrical switch or an electrical plug-in with ease, allowing the user/installer to safely attach/remove the electrical plug-in or electrical switch.

The improvements of an electrical box, electrical switch and electrical plug-in mechanism will function as intended/designed via earlier developed electrical boxes, electrical switches and electrical plug-ins. Futher improvements of the electrical box, electrical switch and electrical plug-in mechanism will increase the safety to the user/installer with the newly designed electrical box connection. Improvements include a power connector header wiring connection (male molex electrical wiring connection—switch/plug-in) connected/fastened to a power crimp housing plug (female molex electrical wiring connection—switch/plug-in). The power crimp housing plug electrical wiring is secured/fastened to an electrical box, which in turn completes the electrical curcuit from an electrical box to the electrical switch/plug-in. Conventional electrical boxes consist of exposed electrical wiring connections, increasing the risk of electrical shock to the user/installer, improvements to an electrical box allows the user/installer to complete the wiring connection inside of the electrical box with socket head receptacle fastening set screws. Conventional electrical switches and/or electrical plug-ins are unsafe to the user/installer, current electrical switches and/or electrical plug-ins are supplied with fastening screws, which increases installation time and in return exposing electrical wiring to the user/installer during installation. Installation of the newly improved electrical box, electrical switch or electrical plug-in design alows the user/installer to update the existing electrical box(s) without having additional wiring, with the exception of the existing wiring connected to the terminals inside of the old existing electrical box to be replaced. Installation/replacement of the existing electrical wiring is simple for the user/installer, allowing the use/installer to reuse/connect the existing supply wiring inside of an electrical box with socket head receptacle fastening set screws, fastening the existing supply electrical wiring inside of an electrical box.

BRIEF SUMMARY OF THE INVENTION

The newly improved electrical box, electrical switch and electrical plug-in mechanism is more user/installer friendly, which reduces installation time and in return reduces the difficulty and increases safety to/for user/installer installing/replacing electrical boxes, electrical switches or electrical plug-ins.

In brief, an improved electrical box, electrical switch and electrical plug-in mechanism design allows the user/installer to install/replace an electrical switch or an electrical plug-in, reducing exposure to the existing electrical wires, increasing safety to the user/installer during installation, while reducing/decreasing, risk of shock and/or death. Thus making the installation/replacement of an electrical box, electrical plug-in or electrical switch safe, fast and easy for the user/installer.

BRIEF DESCRIPTION OF THE SEVERAL VIEWS OF THE DRAWING

The following changes and specific design improvements of this current invention will become starkly apparent from the following detailed description of the invention, when taken into consideration with the drawings, in which:

FIG. 3 is a side view of an electrical box, electrical switch and electrical plug-in;

FIG. 4 is a rear view of an electrical swich and electrical plug-in;

DETAILED DESCRIPTION OF THE INVENTION

Figure 1:
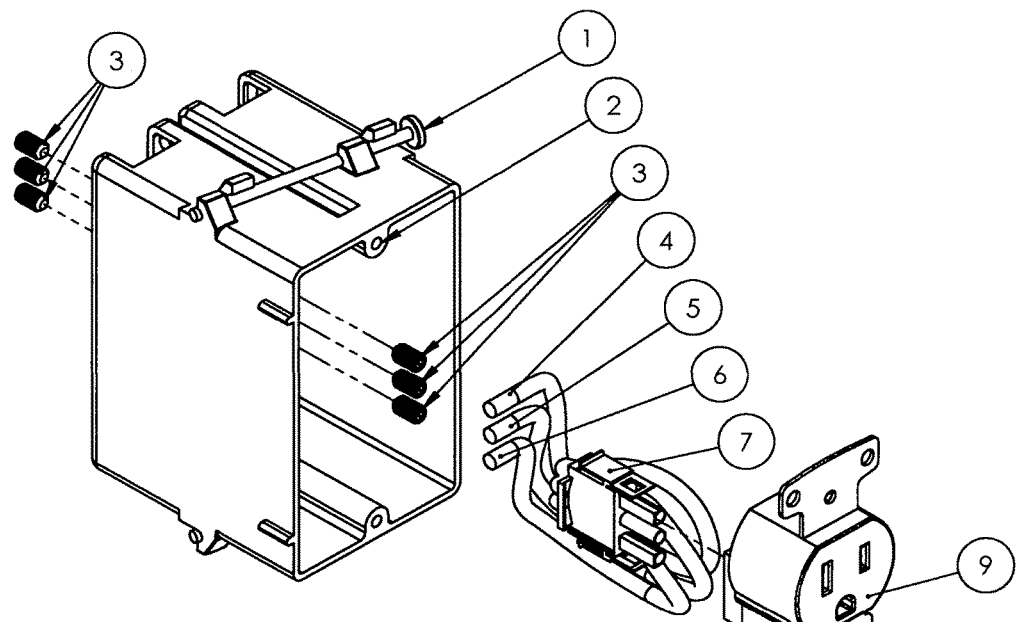
FIG. 1 is an exploded sectional view of an electrical box, electrical switch and electrical plug-in of FIG. 2, FIG. 3, FIG. 4 & FIG. 5.

Turning to FIG. 1, an electrical box, electrical switch and electrical plug-in in accordance with the current invention, is illustrated. Electrical box, electrical switch and electrical plug-in references a 16*d* 3¼" bright common framing nail 1 for attaching an electrical box 8 with installation of an electrical box 8. An electrical box 8 further includes a electrical switch/plug-in wallplate aperturere 2 to install/attach a wallplate a electrical switch and plug-in 9. Further referencing an electrical box 8 includes a power crimp housing plug 7 for quick and easy installation/replacement of an electrical switch and electrical plug-in 9. A power crimp housing plug 7 (male electrical wiring connection) includes a power/power in electrical wire 4, neutral/power out electrical wire 5 and a ground electrical wire 6, which connects to a power connector header 9 (female electrical connection) completing the electrical connection between a power crimp housing plug 7 and a power connector header 9 with an electrical box 8. Socket head receptacle fastening set screws 3 secure a power/power in electrical wire 4, neutral/power out electrical wire 5 and a ground electrical wire 6, within an electrical box 8 completing an electrical wiring circuit from an electrical box 8.

Figure 2:
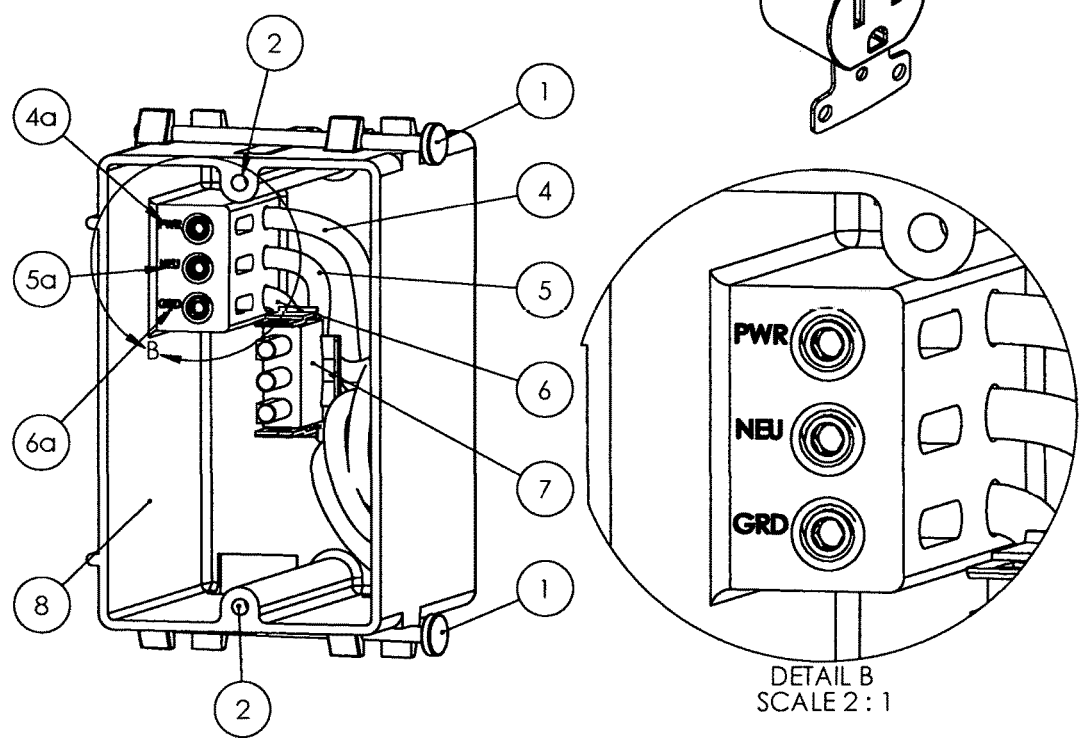
FIG. 2 is a perspective view of an electrical box and exploded view of a electrical boxes electrical connection in accordance with the present invention.

Referring to FIG. 2, an electrical box in accordance with the current invention, is illustrated. An electrical box 8 includes a 16*d* 3¼" bright common framing nail 1 to attach/mount an electrical box 8. An electrical box 8 further includes a electrical switch/plug-in wallplate aperturere 2 to install/attach a wallplate to cover the electrical components located within an electrical box 8. Electrical wiring connections within an electrical box 8 are labeled power/power in—electrical supply (PWR/PWR IN) 4*a*, power/power out—electrical supply (PWR OUT/NEU) 5*a* and ground—electrical supply (GRD) 6*a* providing an electrical connection. Electrical box wiring connections are shown in detail B referencing a magnified perspective view labeled power/power in—electrical supply (PWR/PWR IN) 4*a*, power/power out—electrical supply (PWR OUT/NEU) 5*a* and ground—electrical supply (GRD) 6*a* to assist the user/installer with installation/connection of electrical wiring within the electrical box 8. A power crimp housing plug 7 (male electrical wiring connection) includes a power/power in electrical wire 4, neutral/power out electrical wire 5 and a ground electrical wire 6 which is secured with socket head receptacle fastening set screws 3, illustrated in FIG. 1, a power/power in electrical wire 4, neutral/power out electrical wire 5 and a ground electrical wire 6, complete an electrical wiring connection within an electrical box 8. An electrical wiring connection wiring harness is comprised of twelve gauge stranded/coated/flexible electrical wiring which is affixed to a power crimp housing plug (male electrical wiring connection) 7 within the electrical box 8. Referencing further to FIG. 1, a power crimp housing plug (male electrical wiring connection) 7 is secured/fastened with socket head receptacle fastening set screws 3, electrical wiring (power/power in, neutral/power out and ground) and electrical wiring connection for an electrical switch and/or electrical plug-in 9 within the electrical box 8 which includes a electrical switch or electrical plug-in installation/removal/replacement for compatibility of an electrical box 8.

Figure 3:
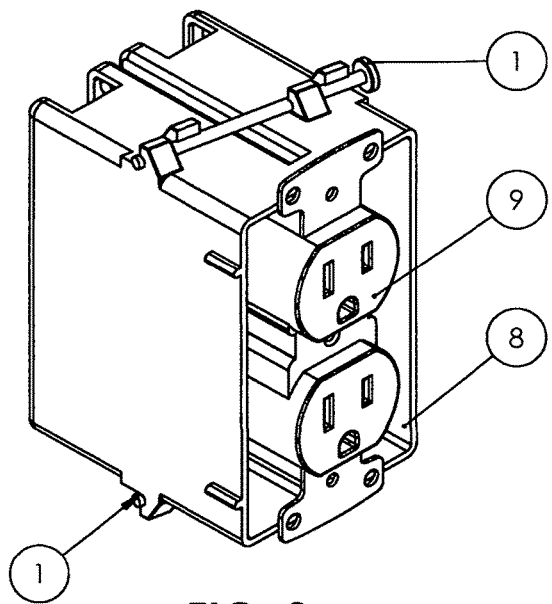

Referring to FIG. 3, an electrical box in accordance with the current invention, is illustrated. An electrical box 8 which is illustrated in FIG. 3, an electrical switch and/or electrical plug-in 9 installed into an electrical box 8 including a 16*d* 3¼" bright common framing nail 1 to attach/mount an electrical box 8.

Figure 4:
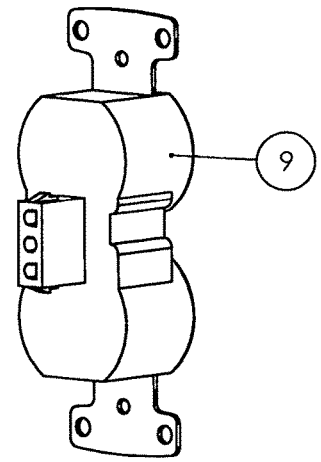

Referring to FIG. 4, an electrical switch and/or plug-in 9 in accordance with the current invention, is illustrated. An electrical switch and/or plug-in 9 references the backside of an electrical switch and/or plug-in, with a power connector header 9 (female electrical wiring connection), which in turn, connects to a power crimp housing plug 7 (male electrical wiring connection) to complete an electrical circuit/connection.

Figure 5:
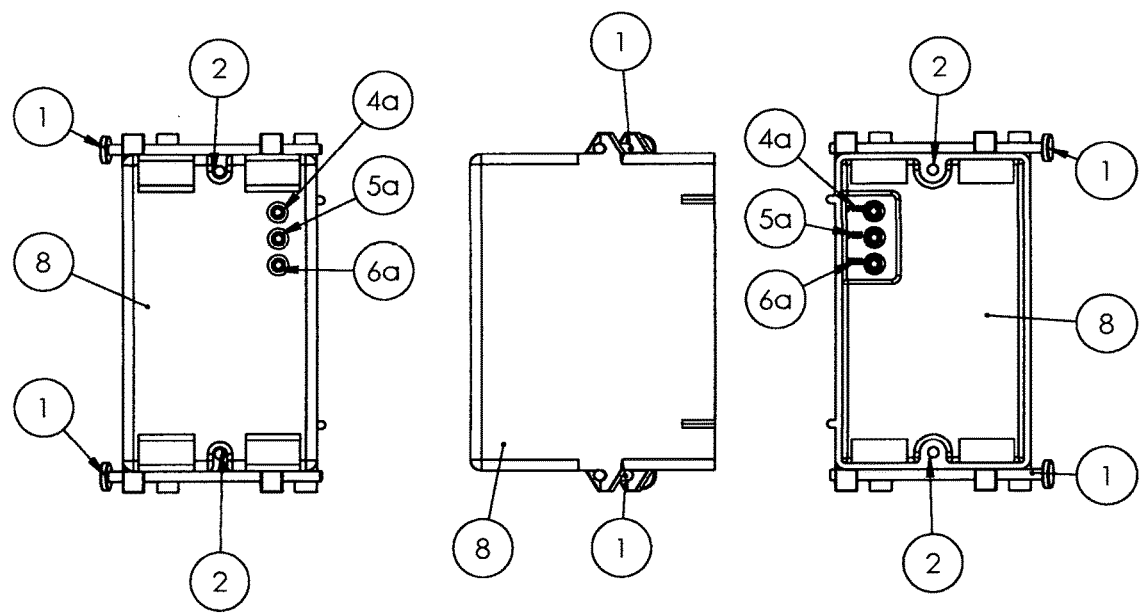
FIG. 5 is a rear view, side view and a front view of an electrical box.

Referring to FIG. 5, an electrical box in accordance with the current invention, is illustrated. An electrical box 8, illustrated in FIG. 5, an electrical box 8 referencing a rear view, side view and a front view of an electrical box 8. Illustrated in FIG. 5, a rear, side and front perspective view design of the electrical box 8, electrical switch/plug-in wallplate apertures 2, power/power in—electrical supply 4a, neutral/power out—electrical supply 5a and a ground—electrical supply.

A electrical box, electrical switch and electrical plug-in mechanism consists of a newly improved wall box design. An electrical box replaces an existing electrical box, and in turn, reusing existing electrical wiring (20 AMPS capacity) provided with removal/replacement of the existing electrical box. An electrical box, electrical switch and electrical plug-in mechanism provides easy installation/removal to a user/installer with the newly designed electrical box, electrical switch and electrical plug-in.

An electrical box, electrical switch and electrical plug-in mechanism will also allow for fast and easy replacement of electrical box recepticles (standard 2"×4" stud boards) in construction and/or replacement for the user/installer. Replacing/updating an existing electrical box, electrical switch and/or electrical plug-in with an improved electrical box, electrical switch and electrical plug-in will be significantly safer and quicker for the user/installer. Design features of the electrical box allows the user/installer to safely install the newly designed electrical box, electrical switch and electrical plug-in with an existing wiring connection. Further design features of an electrical box, electrical switch and/or plug-in will allow a user/installer to install/replace an electrical box, electrical switch and/or electrical plug-in, reducing electrical exposure to existing electrical wires, increasing safety to the user/installer during installation, reducing the risk of electrical shock and/or death. Thus making the installation/replacement of an electrical box, electrical plug-in or electrical switch safe, fast and easy for the user/installer.

An electrical box, electrical switch and/or electrical plug-in mechanism provides a newly improved design, allowing the user/installer to complete a electrical wiring connecection inside of an electrical box with a power crimp housing plug and a power connector header. Current electrical switches or electrical plug-ins are unsafe to the user/installer via existing electrical box design(s), fastened with screw(s) and exposure to electrical wiring to a user/installer. The newly designed electrical box, electrical switch and/or plug-in has corrected/improved this unsafe design, increasing safety/installation to user/installer. Installation of a newly improved electrical box, electrical switch and/or electrical plug-in mechanism allows the user/installer to update/replace an existing electrical box, electrical switch and/or plug-in without requiring additional electrical wiring, with the exception of the existing wiring connection replacing the old existing electrical box, electrical switch and/or electrical plug-in. Installation of existing electrical wiring is simple for the user/installer, allowing the user/installer to connect existing electrical wiring to an improved electrical box, attaching/securing existing electrical wiring to a newly designed electrical box.

A newly improved electrical box, electrical switch and electrical plug-in mechanism is more user/installer friendly, reducing installation time and reducing difficulty, increasing safety to a user/installer with installation/replacement of electrical boxes, electrical switches or electrical plug-ins.

In brief, a newly improved electrical box, electrical switch and electrical plug-in allows the user/installer to replace an electrical box, electrical switch or electrical plug-in, reducing exposure to electrical wiring, reducing the risk of shock and/or death. Installation/replacement of an electrical box, electrical switch or electrical plug-in will provide a safe installation environment, quick/safe installation, providing a less complicated electrical wiring installation of a electrical box, electrical switch and electrical plug-in via user/installer during installation.

Various changes, improvements and modifications to the electrical box, electrical switch and electrical plug-in, will be clearly recognized in the illustrations. Such modifications and specific design improvements of this current invention, along with a detailed description, are intended and included within the scope which is assessed only by a fair interpretation of the following claims.

Having fully described the improvements, along with a detailed description, in a clear and concise manner, to help assist with the understanding of the invention claimed.

SEQUENCE LISTING (IF ANY)

Not Applicable.

The invention claimed is:

1. An electrical box for use for mounting to a building framework, and for securing one of an electric switch or electrical plug-in device, comprising:
   an electrical box, said electrical box having interior walls, a wiring connector provided within said electrical box and secured to one of its interior walls;
   said wiring connector having a series of slots for application of a series of incoming electrical wires, said electrical box having at least one opening for providing the entrance for an exterior electrical wire therethrough, and for securing said electrical wires within select of the series of wiring connector slots, a series of set screws fastening to the wiring connector to fix the electrical wires to the said wiring connector;
   a male electrical wiring connector provided within said electrical box, said male electrical wiring connector being unmounted with the said electric box to allow for its shifting within said electrical box when being plugged into one of said electrical switch or electrical plug-in device;
   an internal electrical wire securing at one end to said male electrical wiring connector, to provide for attaching thereto a power in, a power out, and a ground wire to said male electrical wiring connector, and said internal electrical wire securing at its other end within other slots provided in the said wiring connector, and further said screws fastening the other ends of said internal electrical wiring to said wiring connector;
   said male electric wiring connector having male plugs extending integrally forwardly thereof for plugging into the backside of the electrical switch or electrical plug-in socket device.

2. The electrical box of claim 1, wherein said wiring connector having separate slots for securing power in, power out, and ground wires for the incoming external electrical wiring, and said wiring connector having said further slots for securing the power in, power out, and ground wires of said internal electrical wire.

3. The electrical box of claim 2, wherein said electrical box, said external wiring, said internal electrical wire, and said male electrical wiring connector provided for processing of alternating current.

4. The electrical box of claim 1, wherein the various slots of the wiring connector when mounting the incoming electrical wiring, and the internal electrical wire of the wiring connector when secured within the slots of the wiring connector eliminates any bare wiring within the electrical box during its installation and usage.

* * * * *